United States Patent
Kraft et al.

(10) Patent No.: US 8,864,167 B2
(45) Date of Patent: Oct. 21, 2014

(54) GAS BAG ARRANGEMENT FOR A VEHICLE OCCUPANT RESTRAINT SYSTEM AND METHOD FOR MANUFACTURING SUCH GAS BAG ARRANGEMENT

(75) Inventors: Michael Kraft, Dornstadt (DE); Rainer Bausenhart, Senden (DE); Manfred Schmid, Illertissen (DE); Robert Getz, Ulm (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/474,644

(22) Filed: May 17, 2012

(65) Prior Publication Data

US 2012/0292891 A1 Nov. 22, 2012

(30) Foreign Application Priority Data

May 18, 2011 (DE) .......................... 10 2011 076 056

(51) Int. Cl.
*B60R 21/232* (2011.01)
*B60R 21/2338* (2011.01)
*B60R 21/201* (2011.01)
*B60R 21/16* (2006.01)

(52) U.S. Cl.
CPC ......... *B60R 21/201* (2013.01); *B60R 2021/161* (2013.01); *B60R 21/232* (2013.01); *B60R 21/2338* (2013.01); *B60R 2021/23386* (2013.01)
USPC .................... 280/728.2; 280/730.2; 280/743.2

(58) Field of Classification Search
CPC B60R 21/201; B60R 21/232; B60R 21/2338; B60R 21/213; B60R 21/214; B60R 21/215; B60R 2021/23386; B60R 2021/161
USPC ............. 280/730.2, 743.2, 733, 728.2, 730.1, 280/728.1
See application file for complete search history.

(56) References Cited

U.S. PATENT DOCUMENTS

| | | |
|---|---|---|
| 5,899,486 A | 5/1999 | Ibe |
| 6,375,214 B1 * | 4/2002 | Nishikaji .................... 280/728.2 |
| 6,851,710 B2 | 2/2005 | Wong et al. |
| 7,097,200 B2 * | 8/2006 | Wold ......................... 280/730.2 |
| 7,172,212 B2 | 2/2007 | Aoki et al. |
| 7,364,189 B2 | 4/2008 | Morris et al. |
| 7,516,978 B2 | 4/2009 | Quach et al. |
| 2003/0098573 A1 | 5/2003 | Sonnenberg et al. |
| 2010/0013203 A1 | 1/2010 | Mitchell et al. |

FOREIGN PATENT DOCUMENTS

| | | |
|---|---|---|
| DE | 197 12 039 A1 | 11/1997 |
| DE | 10 2006 051 464 A1 | 6/2007 |

OTHER PUBLICATIONS

Definition of End from the Free Merriam-Webster Dictionary (http://www.merriam-webster.com/dictionary/end).*
Office Action in DE 10 2011 076 056.3 dated Apr. 26, 2012.

* cited by examiner

*Primary Examiner* — Keith Frisby
(74) *Attorney, Agent, or Firm* — Foley & Lardner LLP

(57) ABSTRACT

A gas bag arrangement for a vehicle occupant restraint system of a motor vehicle. The gas bag arrangement comprising a gas bag package which includes a folded gas bag and a wrapping which at least partly surrounds the folded gas bag, at least one connecting strap for connecting the gas bag to a holding structure of the motor vehicle, wherein the connecting strap is attached to a fastening portion of the gas bag and a deflection device arranged at the wrapping or formed by the wrapping, at which the connecting strap—relative to the condition of the gas bag arrangement as mounted in the vehicle—is deflected in direction of the holding structure. A section of the connecting strap coming from the fastening portion extends up to the deflection device away from the holding structure and at the deflection device again is deflected towards the holding structure.

13 Claims, 1 Drawing Sheet

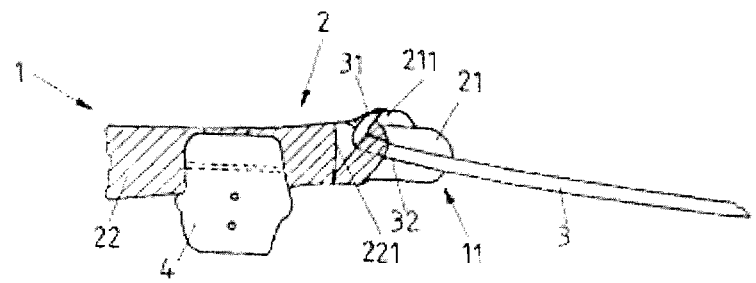
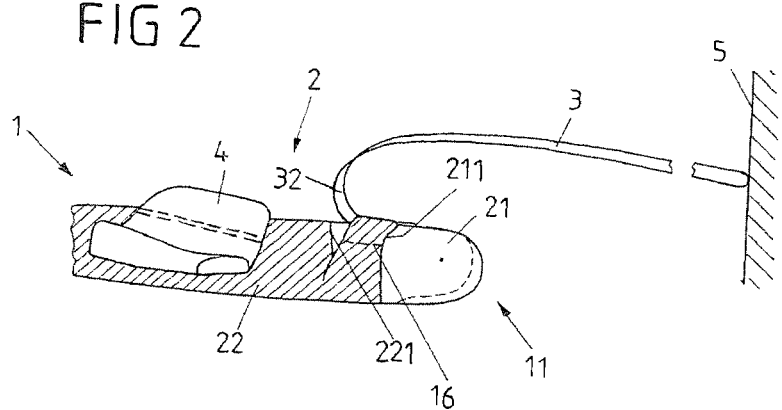
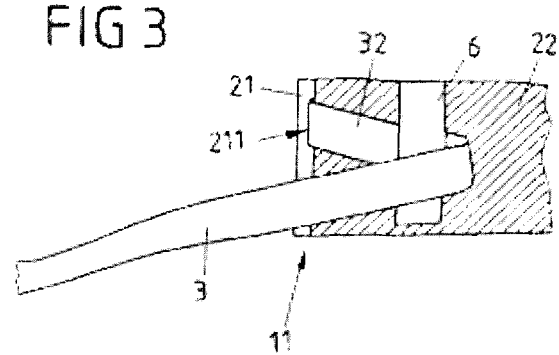

GAS BAG ARRANGEMENT FOR A VEHICLE OCCUPANT RESTRAINT SYSTEM AND METHOD FOR MANUFACTURING SUCH GAS BAG ARRANGEMENT

BACKGROUND OF THE INVENTION

This invention relates to a gas bag arrangement for a vehicle occupant restraint system of a motor vehicle and to a method for manufacturing such gas bag arrangement.

From the prior art gas bag arrangements are known, which include a gas bag (in particular in the form of a curtain gas bag) which is attached to a holding structure e.g. of the vehicle body via at least one connecting strap (catch strap), in order to stabilize the position of the gas bag in the inflated condition. A curtain gas bag held by catch straps is known for example from U.S. Pat. No. 6,851,710 B2 (incorporated by reference herein). The invention described herein can be employed on a curtain gas bag such as shown, for example, in the aforementioned U.S. patent.

SUMMARY OF THE INVENTION

The problem underlying the present invention consists in creating a gas bag arrangement with a gas bag attached to a holding structure by means of a connecting strap, which can be manufactured as inexpensively as possible. Furthermore, a method for manufacturing such gas bag should be provided.

According to an exemplary embodiment of the invention there is provided a gas bag arrangement for a vehicle occupant restraint system of a motor vehicle, comprising: a gas bag package which includes a folded gas bag and a wrapping which at least partly surrounds the folded gas bag; at least one connecting strap for connecting the gas bag to a holding structure of the motor vehicle, wherein the connecting strap is attached to a fastening portion of the gas bag; and a deflection device arranged at the wrapping or formed by the wrapping, at which the connecting strap—relative to the condition of the gas bag arrangement as mounted in the vehicle—is deflected in direction of the holding structure, wherein a section of the connecting strap coming from the fastening portion extends up to the deflection device away from the holding structure and at the deflection device again is deflected towards the holding structure.

By means of the deflection device the connecting strap (catch strap) is guided such that its effective length between the gas bag package and the holding structure—relative to the condition of the gas bag arrangement as mounted in the vehicle—is shortened in the non-deployed condition of the gas bag, i.e. is shorter than the length of the connecting strap between the fastening portion of the gas bag, to which the connecting strap is attached, and the holding structure. By shortening the connecting strap, sagging of the connecting strap between the gas bag package and the holding structure is avoided before deployment of the gas bag.

The greater length between the gas bag and the holding structure (i.e. more exactly between the fastening portion of the gas bag and a connecting point of the holding structure, at which the connecting strap is fixed), which is required in the deployed condition of the gas bag, is provided in that the deflection device is formed such that it releases the connecting strap upon deployment of the gas bag, so that the connecting strap can tension upon deployment of the gas bag and e.g. with at least almost its entire length extend between the gas bag and the holding structure. Examples of suitable deflection devices will be explained below.

According to one exemplary aspect of the invention, the section of the connecting strap coming from the fastening portion of the gas bag extends up to the deflection device away from an end of the gas bag package to be turned towards the holding structure and again is deflected at the deflection device (for example by approximately 180°) towards the end of the gas bag package. In particular, the gas bag package has an oblong form, wherein the gas bag can be folded in by means of a roll fold and/or some other fold (for example Z-fold). In the mounted condition of the gas bag arrangement the gas bag package for example extends along a roof rail, so that a first end of the gas bag package is located in a front region of the vehicle and a second end in a rear region of the vehicle.

For example, a connecting portion of the connecting strap is fixed on an outside of the gas bag, for example in a cohesive manner or by a sewn seam, wherein the fastening portion of the gas bag, at which the connecting portion of the connecting strap is fixed, is located e.g. in the region of the end of the folded gas bag to be turned towards the holding structure. In particular, it is conceivable that in the deployed condition of the gas bag the fastening portion of the gas bag forms a partial region of a side portion of the gas bag facing the vehicle front. For example, the holding structure to which the gas bag is connected via such front connecting strap is the A-pillar of the vehicle.

It is also possible that alternatively or in addition a rear connecting strap is provided, wherein the fastening portion of the gas bag, with which the connecting portion (e.g. in the form of a first end) of the connecting strap is connected, faces e.g. the C-pillar of the vehicle as holding structure. Another portion (for example in the form of a second end) of the connecting strap is connected with the C-pillar.

In addition, the deflection device can have a greater distance to one end of the gas bag package, which in the mounted condition of the gas bag arrangement faces the holding structure, than the fastening portion of the gas bag. The connecting strap thus is guided away from the fastening portion of the gas bag (in direction of the remaining gas bag package) in the manner of a loop, so that the effective length of the connecting strap between the gas bag package and the holding structure initially is shortened (before deployment of the gas bag), as already explained above.

For example, the deflection device forms a deflection edge at which the section of the connecting strap coming from the fastening portion of the gas bag is deflected. For example, this deflection edge has a greater distance to the end of the gas bag package than the fastening portion of the gas bag.

According to one exemplary aspect of the invention, the deflection device has at least one opening formed in the wrapping or is formed by such opening, wherein the section of the connecting strap is guided through this opening. In particular, an edge of the opening forms a deflection edge at which the connecting strap is deflected. For this purpose, the opening can be formed oblong, in particular in the form of a slot.

According to one exemplary variant, the section of the connecting strap extends up to the opening formed in the wrapping at least partly within the wrapping and exits from the wrapping through the opening. It is, however, also conceivable that the section of the connecting strap at least partly extends outside the wrapping and enters into the wrapping through the opening. For example, the wrapping therefor includes at least one further opening through which the connecting strap first exits from the wrapping and again enters into the wrapping through the opening of the deflection device. For example, such further opening is provided in an end (in particular in an end face) of the wrapping, wherein the section of the connecting strap e.g. exits to the outside through this further opening for a first time, again enters into the wrapping through the opening of the deflection device, and then passes through the further opening to the outside for a second time in direction of the holding structure of the vehicle.

It is also possible that the wrapping does not surround the folded gas bag along its entire length, i.e. the wrapping has an opening in an end face through which the gas bag partly protrudes from the wrapping, wherein the fastening portion can be formed in this region of the gas bag protruding from the wrapping. From such fastening portion, the connecting strap then can first be guided along the outside of the wrapping and then can enter into the wrapping through the opening of the deflection device.

Furthermore, the wrapping can have a weakened portion (e.g. a perforation) along which the wrapping tears open upon deployment of the gas bag, wherein e.g. a section of the opening of the deflection device overlaps with the weakened portion, so that the connecting strap is released as quickly as possible upon deployment and tearing open of the wrapping. It is also possible that the opening is arranged in the vicinity of the weakened portion, e.g. a portion of the opening is located at a distance of max. 1 cm from the opening.

According to another exemplary variant of the invention, the deflection device includes at least one fastening element which fixes the section of the connecting strap at the wrapping. For example, the fastening element is cohesively fixed at the wrapping and for example can be an adhesive tape with which a portion of the connecting strap is attached to the outside of the wrapping. It is, however, also conceivable that the fastening element fixes the deflected section of the connecting strap on an inside of the wrapping. A cohesive connection between the fastening element and the wrapping, however, is not absolutely necessary. It is also conceivable that the fastening element for example is pushed onto the wrapping in a ring-like manner and clampingly retains the connecting strap at the wrapping.

It should be noted that different variants of the deflection device can also be used in combination with each other. It is possible, for example, that a first (for example front) connecting strap is deflected via a deflection device in the form of an opening in the wrapping and a second (for example rear) connecting strap via a deflection device in the form of a fastening element which fixes the connecting strap at the wrapping.

The wrapping in particular is formed of a flexurally soft material (for example a textile gas bag material), i.e. it is a so-called "soft cover." It is, however, also conceivable that the wrapping is formed of a dimensionally stable material (for example a plastic material) (such as by injection molding).

The invention also relates to a vehicle with a gas bag arrangement as described above.

Furthermore, the invention relates to a method for manufacturing a gas bag arrangement as described above, with the following steps: manufacturing a gas bag package, which includes a folded gas bag and a wrapping which at least partly surrounds the folded gas bag; attaching a connecting strap for connecting the gas bag to a holding structure of the motor vehicle to a fastening portion of the gas bag; arranging a deflection device at the wrapping or forming a deflection device by the wrapping, wherein the connecting strap—relative to the condition of the gas bag arrangement as mounted in the vehicle—is deflected at the deflection device in direction of the holding structure; and arranging a section coming from the fastening portion such that it extends up to the deflection device away from the holding structure and at the deflection device again is deflected towards the holding structure.

BRIEF DESCRIPTION OF THE DRAWINGS

The invention will subsequently be explained in detail by means of exemplary embodiments with reference to the Figures:

FIG. 1 shows a gas bag arrangement according to a first exemplary embodiment of the invention.

FIG. 2 shows a gas bag arrangement according to a second exemplary embodiment of the invention.

FIG. 3 shows a gas bag arrangement according to a third exemplary embodiment of the invention.

DETAILED DESCRIPTION

The gas bag arrangement 1 of a vehicle occupant restraint system according to the invention as shown in FIG. 1 comprises a gas bag package 2 with an at least partly roll-folded curtain gas bag 21 which is surrounded by a wrapping 22 formed of a flexurally soft material (i.e. as "soft cover"). In particular, the gas bag package 2 mounted in the vehicle extends in an oblong manner along a roof rail of a vehicle.

Furthermore, the gas bag arrangement 1 comprises a connecting strap in the form of a catch strap 3, which with one end 31 is fixed at a fastening portion 211 of the gas bag 21. The fastening portion 211 is located in an end portion of the folded gas bag 21, which protrudes from the wrapping 22. More exactly, the wrapping 22 is formed of a material layer which is wound around the folded gas bag 21, so that the wrapping 22 has an open end from which the gas bag 21 protrudes with the fastening portion 211.

The catch strap 3 serves to stabilize the position of the gas bag after its deployment in the vehicle. For this purpose, a free end (not shown in FIG. 1) of the catch strap 3 is connected with a holding structure (not shown in FIG. 1), for example in the form of a portion of the vehicle body, in particular of the A-pillar or the C-pillar. The use of a catch strap, however, is known in principle from the prior art, so that this will not be discussed in detail.

The gas bag arrangement 1 according to the invention furthermore includes a deflection device in the form of a slot-shaped opening 221 in the wrapping 22, through which a section 32 of the catch strap 3 is guided. More exactly, the fastening region 211 of the gas bag 21, at which the catch strap 3 is fixed, is located closer to an end 11 of the gas bag package 2 to be turned towards the holding structure, which is defined by the end of the gas bag 21, than the opening 211, so that the section 32 of the catch strap 3 coming from the fastening portion 211 initially extends (on an outside of the gas bag package) from the end 11 of the gas bag package 2 (and hence away from the holding structure) and then is guided through the opening 221 into the interior of the wrapping. The section 32 of the catch strap 3 furthermore is deflected on an edge side of the opening 221 facing the end 11 of the gas bag package 2 and thus continues to extend in direction of the end 11 and the holding structure.

Due to this course realized by means of the opening 221, the catch strap 3 is gathered, i.e. its length between the gas bag package 2 and the holding structure is reduced, so that before deployment of the gas bag sagging of the catch strap between the gas bag package and the holding structure is avoided. After deployment of the gas bag, however, a catch strap length is required which is greater than the distance between the fastening portion 211 of the gas bag and a fastening portion of the holding structure, at which the catch strap is fixed, in the non-deployed condition of the gas bag.

This becomes possible in that the wrapping 22 tears open upon deployment of the gas bag 21, so that there is no more deflection of the catch strap at the lateral edge of the opening 221, i.e. the catch strap is released, so that it can tension at least approximately along its entire length.

At the wrapping 22 a fastening tab 4 is mounted, via which the gas bag package 1 can be mounted at the vehicle body.

In a series production of the gas bag package 2, the wrapping 22 in particular is also pulled onto the folded gas bag 21 in a defined way, so that there is always obtained a defined distance between the position of the slot 221 and the fastening portion 31, whereby the effective length of the catch strap 3 between the gas bag package and the holding structure before deployment of the gas bag likewise is defined in a reproducible manner.

In a development, the catch strap is at least partly provided with a marking (for example in the form of a seam along the catch strap), in order to optically bring out the catch strap as compared to other components of the gas bag arrangement and thus e.g. simplify the assembly of the gas bag package. For example, the catch strap is provided with a colored marking which forms a rather high contrast to the color of the catch strap; for example, the marking is realized by a colored seam which is visible through the opening 221 even after guiding the catch strap therethrough. It is also conceivable that the catch strap itself is designed in a color which has a rather high color contrast in particular to the color of the wrapping 22; for example, with a light-colored (e.g. white) wrapping a dark (e.g. black) catch strap is used.

FIG. 2 relates to a second exemplary embodiment of the invention, wherein the gas bag arrangement 1 has the same components as the gas bag arrangement according to FIG. 1.

In contrast to FIG. 1, the catch strap 3 is, however, not guided through the opening 221 from outside, but extends from the fastening portion 211 of the gas bag 21 in the interior of the wrapping 22 and exits from the wrapping 22 to the outside through the opening 221. Subsequently, the section of the catch strap 3 exiting from the opening 221 is deflected at a lateral edge of the opening 221 in direction of the end 11 of the gas bag package (in direction of the holding structure 5).

In addition, it is conceivable that the wrapping 22 has a weakened portion 16, such as a perforation, along which the wrapping preferably tears open upon deployment of the gas bag. In particular, the opening 221 overlaps with the perforation, so that on tearing open of the opening the catch strap 3 is released as quickly as possible and the catch strap can tension.

FIG. 3 shows a gas bag arrangement according to the invention which includes a deflection device designed differently as compared to FIGS. 1 and 2. Here, the deflection device is not formed by an opening in the wrapping 22, but by a fastening element in the form of an adhesive strip 6 with which the section 32 of the catch strap 3 coming from the fastening portion 211 of the gas bag 21 is fixed at an outside of the wrapping 22.

More exactly, the section 32 of the catch strap 3 extends through an end-face opening of the wrapping 22, from which the gas bag 21 protrudes with a portion, and then extends up to the adhesive strip 6 away from the end 11 of the gas bag package along an outside of the wrapping 22. At the adhesive strip 6, a deflection of the catch strap 3 in direction of the end 11 of the gas bag package finally is effected.

It should be noted that elements of FIGS. 1 to 3 can of course also be used in combination with each other. For example, a deflection device in the form of an adhesive strip 6 also can be provided in addition to the opening 221 in the wrapping 22. Furthermore, it is conceivable that the colored marking of the catch strap as described in connection with FIG. 1 also is used in the variants of FIGS. 2 and 3.

This application claims the benefit of German Patent Application No. 10 2011 076 056.3 filed on May 18, 2011 including the specification, drawings, claims and abstract, which are fully incorporated herein by reference.

The invention claimed is:

1. A gas bag arrangement for a vehicle occupant restraint system of a motor vehicle, comprising
    a gas bag package which includes a folded gas bag and a wrapping which at least partly surrounds the folded gas bag;
    at least one connecting strap for connecting the gas bag to a holding structure of the motor vehicle, wherein the connecting strap is attached to a fastening portion of the gas bag; and
    a deflection device formed from the wrapping, at which the connecting strap—relative to the condition of the gas bag arrangement as mounted in the vehicle—is deflected in a direction of the holding structure, wherein
    a section of the connecting strap coming from the fastening portion extends up to the deflection device away from the holding structure and at the deflection device again is deflected towards the holding structure,
    wherein the section of the connecting strap extends up to the deflection device away from a side end of the gas bag package to be turned towards the holding structure and at the deflection device again is deflected towards the side end of the gas bag package.

2. The gas bag arrangement according to claim 1, wherein the deflection device has a greater distance to the side end of the gas bag package than the fastening portion of the gas bag to which the connecting strap is attached.

3. The gas bag arrangement according to claim 1, wherein the deflection device forms a deflection edge at which the section of the connecting strap is deflected.

4. The gas bag arrangement according to claim 1, wherein the deflection device is formed such that it releases the connecting strap upon deployment of the gas bag.

5. The gas bag arrangement according to claim 1, wherein the deflection device has at least one opening formed in the wrapping, through which the section of the connecting strap is guided.

6. The gas bag arrangement according to claim 5, wherein the section of the connecting strap extends up to the opening within the wrapping and exits from the wrapping through the opening.

7. The gas bag arrangement according to claim 5, wherein the opening is formed oblong.

8. The gas bag arrangement according to claim 5, wherein the wrapping has a weakened portion along which the wrapping tears open upon deployment of the gas bag, wherein a section of the opening overlaps with the weakened portion.

9. The gas bag arrangement according to claim 1, wherein the fastening portion of the gas bag, to which the connecting strap is attached, is located outside the wrapping.

10. The gas bag arrangement according to claim 1, wherein the wrapping is formed of a textile gasbag material.

11. A method for manufacturing a gas bag arrangement according to claim 1, with the following steps:
    manufacturing a gas bag package, which includes a folded gas bag and a wrapping which at least partly surrounds the folded gas bag;
    attaching a connecting strap for connecting the gas bag to a holding structure of the motor vehicle to a fastening portion of the gas bag;

forming a deflection device from the wrapping, wherein the connecting strap—relative to the condition of the gas bag arrangement as mounted in the vehicle—is deflected at the deflection device in a direction of the holding structure; and arranging a section of the connecting strap coming from the fastening portion such that it extends up to the deflection device away from the holding structure and at the deflection device again is deflected towards the holding structure, wherein the section of the connecting strap extends up to the deflection device away from a side end of the gas bag package to be turned towards the holding structure and at the deflection device again is deflected towards the side end of the gas bag package.

12. The gas bag arrangement according to claim 1, wherein the airbag package has an oblong form having a first and second end, wherein, when mounted in the vehicle, the first end is located in a front region of the vehicle and the second end is located on a rear region of the vehicle, and the side end is one of the first and second ends.

13. A gas bag arrangement for a vehicle occupant restraint system of a motor vehicle, comprising a gas bag package which includes a folded gas bag and a wrapping which at least partly surrounds the folded gas bag;

at least one connecting strap for connecting the gas bag to a holding structure of the motor vehicle, wherein the connecting strap is attached to a fastening portion of the gas bag; and a deflection device formed by the wrapping, at which the connecting strap—relative to the condition of the gas bag arrangement as mounted in the vehicle—is deflected in a direction of the holding structure, wherein a section of the connecting strap coming from the fastening portion extends up to the deflection device away from the holding structure and at the deflection device again is deflected towards the holding structure, wherein the section of the connecting strap extends up to the deflection device away from an end of the gas bag package to be turned towards the holding structure and at the deflection device again is deflected towards the end of the gas bag package, wherein the deflection device is formed such that it releases the connecting strap upon deployment of the gas bag.

* * * * *